US012725984B2

(12) United States Patent
Kim et al.

(10) Patent No.: US 12,725,984 B2
(45) Date of Patent: Sep. 1, 2026

(54) CONNECTOR ASSEMBLY COMPRISING RECEPTACLE CONNECTOR AND PLUG CONNECTOR, AND PLUG CONNECTOR

(71) Applicants: SENSORVIEW CO., LTD., Gyeonggi-do (KR); OKINS ELECTRONICS CO., LTD, Gyeonggi-do (KR)

(72) Inventors: Byoung Nam Kim, Gyeonggi-do (KR); Kyoung Il Kang, Gyeonggi-do (KR); Jong Hyup Lim, Gyeonggi-do (KR); Dong Uk Lee, Gyeonggi-do (KR); Jae Kun Choi, Gyeonggi-do (KR); Jin Kook Jun, Gyeonggi-do (KR); Sung Gyu Park, Gyeonggi-do (KR); Jong Wook Ham, Gyeonggi-do (KR)

(73) Assignees: SENSORVIEW CO., LTD., Gyeonggi-do (KR); OKINS ELECTRONICS CO., LTD, Gyeonggi-do (KR)

( * ) Notice: Subject to any disclaimer, the term of this patent is extended or adjusted under 35 U.S.C. 154(b) by 380 days.

(21) Appl. No.: 18/573,811

(22) PCT Filed: Jun. 13, 2022

(86) PCT No.: PCT/KR2022/008293

§ 371 (c)(1),
(2) Date: Jan. 31, 2024

(87) PCT Pub. No.: WO2022/270806

PCT Pub. Date: Dec. 29, 2022

(65) Prior Publication Data

US 2024/0291207 A1 Aug. 29, 2024

(30) Foreign Application Priority Data

Jun. 25, 2021 (KR) ........................ 10-2021-0082876

(51) Int. Cl.
*H01R 13/6582* (2011.01)

(52) U.S. Cl.
CPC ................................ *H01R 13/6582* (2013.01)

(58) Field of Classification Search
CPC .. H01R 13/6582; H01R 12/714; H01R 12/79; H01R 13/2464; H01R 12/716; H01R 13/6594; H01R 25/006
See application file for complete search history.

(56) References Cited

U.S. PATENT DOCUMENTS 7,883,364 B2 * 2/2011 Wu .................... H01R 13/6592
439/578
7,892,028 B2 * 2/2011 Wu .................. H01R 13/65918
439/579

(Continued)

FOREIGN PATENT DOCUMENTS

JP S4-74872 U 9/1972
JP 04-074875 U 6/1992

(Continued)

OTHER PUBLICATIONS

Office Action from corresponding Japanese Patent Application No. 2023-579567, dated Nov. 19, 2024.

(Continued)

*Primary Examiner* — Abdullah A Riyami
*Assistant Examiner* — Nader J Alhawamdeh
(74) *Attorney, Agent, or Firm* — Harness, Dickey & Pierce, P.L.C.

(57) ABSTRACT

The connector assembly, according to the present invention, comprises: a receptacle arranged on a substrate; and a plug coupled to the receptacle, wherein the plug includes: a pin having one side electrically connected to a cable and having a contact portion arranged on the other side; a dielectric arranged on the outside of the pin; a shield can arranged on (Continued)

the outside of the dielectric; and a plug shell arranged on the outside of the shield can, wherein the receptacle comprises a first hole, the dielectric comprises a second hole in which the pin is arranged, the pin is arranged in the second hole such that the contact portion protrudes farther than the outer surface of the dielectric, and the dielectric is positioned in the first hole so that the contact portion is directly and elastically in contact with a contact point of the substrate.

8 Claims, 14 Drawing Sheets

(56) References Cited

U.S. PATENT DOCUMENTS

| | | | | |
|---|---|---|---|---|
| 10,211,552 | B2 * | 2/2019 | Zhu | H01R 12/592 |
| 11,469,552 | B2 * | 10/2022 | Kim | H01R 9/0524 |
| 2005/0095902 | A1 * | 5/2005 | Zhang | H01R 12/79 439/493 |
| 2009/0191729 | A1 * | 7/2009 | Kurimoto | H01R 13/02 439/652 |
| 2010/0184330 | A1 * | 7/2010 | Wu | H01R 13/65918 439/607.28 |
| 2021/0242617 | A1 * | 8/2021 | Ji | H01R 13/50 |
| 2024/0170864 | A1 * | 5/2024 | Kim | H01R 9/0524 |
| 2024/0204466 | A1 * | 6/2024 | Kim | H01R 4/023 |
| 2024/0291207 | A1 * | 8/2024 | Kim | H01R 12/79 |
| 2024/0322497 | A1 * | 9/2024 | Kim | H01R 13/6585 |

FOREIGN PATENT DOCUMENTS

| | | | | |
|---|---|---|---|---|
| JP | 2001-035598 | A | 2/2001 | |
| JP | 2013-084498 | A | 5/2013 | |
| JP | 2013-125694 | A | 6/2013 | |
| JP | 2017-098154 | A | 6/2017 | |
| JP | 2018063795 | A | 4/2018 | |
| KR | 20100068002 | A * | 6/2010 | H01R 3/6585 |
| KR | 1020180106187 | A | 10/2018 | |
| KR | 1020180125831 | A | 11/2018 | |
| KR | 102006131 | B1 | 8/2019 | |
| WO | WO-2019136199 | A2 | 7/2019 | |

OTHER PUBLICATIONS

International Search Report from corresponding PCT Application No. PCT/KR2022/008293, dated Sep. 14, 2022.

* cited by examiner

CONNECTOR ASSEMBLY COMPRISING RECEPTACLE CONNECTOR AND PLUG CONNECTOR, AND PLUG CONNECTOR

CROSS-REFERENCE TO RELATED APPLICATION

This application is a national phase entry of PCT Application No. PCT/KR2022/008293, filed on Jun. 13, 2022 and claims priority to Korean Patent Application No. 10-2021-0082876, filed on Jun. 25, 2021. The entire disclosures of the applications identified in this paragraph are incorporated herein by references.

TECHNICAL FIELD

The present invention relates to an electrical connector, and more particularly, to a connector assembly including a receptacle connector and a plug connector, and a plug connector.

BACKGROUND ART

In various types of electronic devices (e.g., wired/wireless communication devices), an internal circuit is provided on a circuit board. A connector assembly including a receptacle connector and a plug connector is used to connect the circuit board to other electronic devices or other circuit boards.

The receptacle connector is mounted on a circuit board, the plug connector is coupled to a cable, and when the plug connector is fastened to the receptacle connector, the pins of the plug connector make direct elastic contact with the circuit board, thereby electrically connecting the cable and the circuit board.

Such connector assemblies are also widely used in high-speed wireless communication devices, such as 5G devices, and high electromagnetic wave shielding performance is required as the frequency increases. However, conventional connector assemblies do not exhibit electromagnetic wave shielding performance as required at high frequencies, and are vulnerable to electromagnetic wave interference between cables and pins, especially when the multiple cables are simultaneously connected to a circuit board with a single connector.

Moreover, when a plug connector is coupled to the receptacle connector, the pins of the receptacle connector connected to the contacts on the board and the pins of the plug connector must make contact. Consequently, there is a complexity in the pin structure, and furthermore, there are issues with the overall complexity and the large number of components in the connector assembly.

DETAILED DESCRIPTION OF THE INVENTION

Technical Problem

An object of the present invention is to provide a connector assembly with a simple configuration that has excellent electromagnetic wave shielding performance and minimizes electromagnetic interference between cables and signal pins within a connector while simultaneously connecting multiple cables to a circuit board, and a plug connector.

The objects to be achieved by the present invention are not limited to the foregoing object, and additional objects, which are not mentioned herein, will be readily understood by those skilled in the art from the following description.

Technical Solution

The connector assembly according to the present invention for achieving the above object includes a receptacle arranged on a substrate, and a plug coupled to the receptacle, wherein the plug includes a pin having one side electrically connected to a cable and having a contact portion arranged on the other side, a dielectric arranged on the outside of the pin, a shield can arranged on the outside of the dielectric, and a plug shell arranged on the outside of the shield can, wherein the receptacle comprises a first hole, the dielectric comprises a second hole in which the pin is arranged, the pin is arranged in the second hole such that the contact portion protrudes farther than the outer surface of the dielectric, and the dielectric is positioned in the first hole so that the contact portion is directly and elastically in contact with a contact point of the substrate.

Preferably, the pin may include a first region that is bent counterclockwise at the contact portion and a second region that is bent counterclockwise at the first region and connected to the cable, and the contact portion and the second region may be arranged in parallel or diagonally.

Preferably, the first region may include a 1-1$^{st}$ region that is bent counterclockwise at the contact portion, and a 1-2$^{nd}$ region that is bent counterclockwise at the 1-1$^{st}$ region and connected to the second region.

Preferably, the dielectric may include a first groove, the second hole may include a 2-1$^{st}$ hole and a 2-2$^{nd}$ hole, the first groove may communicate with the 2-1$^{st}$ hole and the 2-2$^{nd}$ hole, and directions of the 2-1$^{st}$ hole and the 2-2$^{nd}$ hole may be different from each other.

Preferably, the 1-2$^{nd}$ region may be arranged in the 2-1$^{st}$ hole, the second region may be arranged in the 2-2$^{nd}$ hole, and the 1-1$^{st}$ region and the contact portion may be spaced apart from the dielectric.

Preferably, the dielectric may include a second groove communicating with the 2-2$^{nd}$ hole, a portion of the first region may be arranged inside the second groove, and the contact portion may be arranged outside the second groove.

Preferably, the dielectric may include an upper surface in contact with the shield can and a first protrusion protruding from the upper surface, and the shield can may include a third groove in which the protrusion is positioned.

Preferably, the dielectric may include a fourth groove concavely formed on the upper surface, the shield can may include a second protrusion positioned in the fourth groove, and the second protrusion may be positioned between two of the pins.

Preferably, the dielectric may be guided along an inner wall of the first hole.

Preferably, the dielectric may include a fifth groove and a partition wall dividing the first hole of the receptacle, and the partition wall may be arranged in the fifth groove.

A plug connector according to one embodiment includes a pin having one side electrically connected to a cable and having a contact portion arranged on the other side, a dielectric arranged on the outside of the pin, a shield can arranged on the outside of the dielectric and configured to shield electromagnetic waves, and a plug shell arranged on the outside of the shield can and configured to shield electromagnetic waves, wherein the pin includes a first region that is bent counterclockwise at the contact portion and a second region that is bent counterclockwise at the first region and connected to the cable, and the contact portion and the second region are arranged in parallel or diagonally, while the contact portion protrudes farther than the outer surface of the dielectric, so that the pin has resiliency in response to compression of the contact portion.

Advantageous Effects

According to embodiments, electromagnetic waves can be doubly shielded through both a shield can and a plug shell, thereby improving shielding performance.

According to embodiments, a portion of the shield can is positioned between two adjacent pins so that signal interference between the two pins can be prevented.

According to embodiments, configuring the pin of the plug connector to make direct elastic contact with the contact point of the circuit board results in advantages of a simple configuration and a reduced number of parts.

According to embodiments, although the pin is in direct elastic contact with the contact point of the circuit board, a dielectric is configured to surround the pin, ensuring the rigidity of the pin.

According to embodiment, guiding the dielectric into the inner wall of a first hole of a base of a receptacle connector facilitates easy alignment of the pin and the contact point on the circuit board, providing a good coupling between the receptacle connector and the plug connector.

According to embodiments, a first protrusion of the dielectric is inserted into a third groove of the shield can so that the fixation strength of the dielectric can be enhanced and assembly efficiency can be improved.

According to embodiments, the pin includes a second region connected to the cable and a first region connecting the contact portion and the second region and the contact portion and the second region are arranged in parallel or diagonally, thereby increasing the contact force on the contact point of the circuit board, as well as ensuring the resiliency of the pin.

According to embodiments, a portion of the first region of the pin connected to the contact portion is spaced apart from the dielectric, which facilitates the ease of securing resiliency of the pin when the contact portion is pressed.

According to embodiments, a space where the pin can be elastically deformed through a second groove of the dielectric can be ensured when the contact portion of the pin is pressed.

The effects of the present invention are not limited to the foregoing effects, and additional effects, which are not mentioned herein, will be readily understood by those skilled in the art from the following description.

MODE FOR INVENTION

Figure 1:
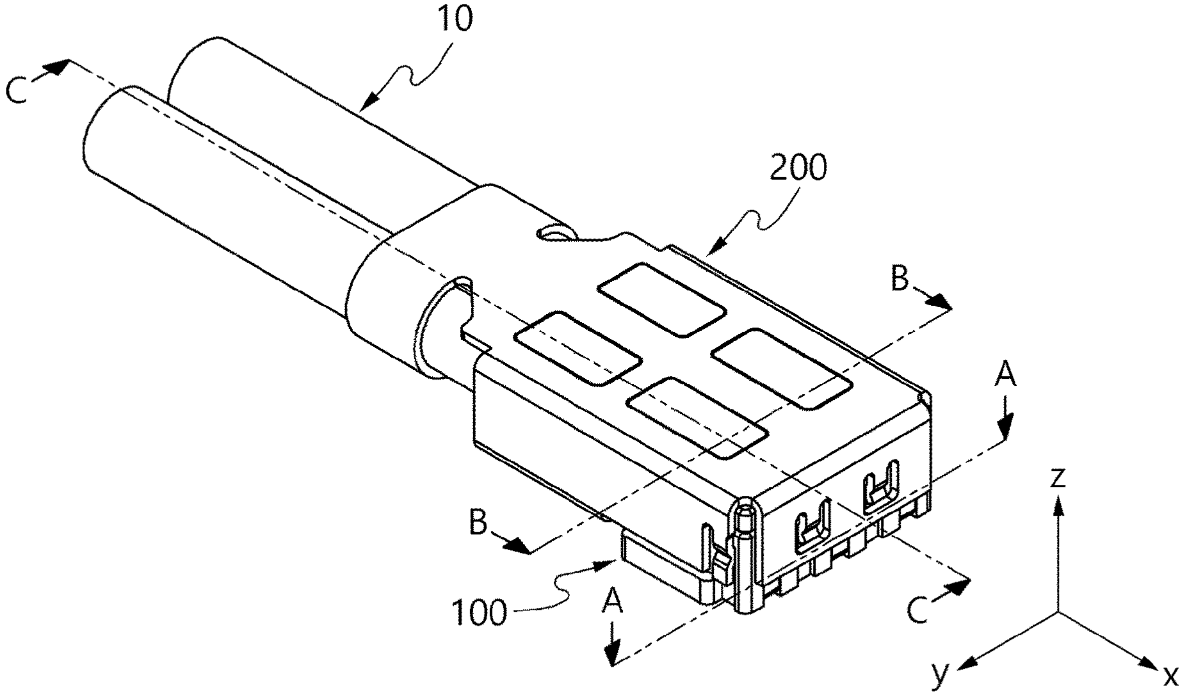
FIG. 1 is a perspective view showing a connector assembly according to an embodiment.

Hereinafter, exemplary embodiments of the present invention will be described in detail with reference to the drawings. In the present specification, reference now should be made to the drawings, in which the same reference numerals are used throughout the different drawings to designate the same or similar components. Further, in the description of the present invention, detailed descriptions of related well-known functions or configurations that are determined to unnecessarily obscure the gist of the present invention will be omitted.

In describing the elements of this specification, terms, such as the first, second, A, B, a, and b, may be used. However, the terms are used to only distinguish one element from other elements, but the essence, order, and sequence of the elements are not limited by the terms.

Figure 2:
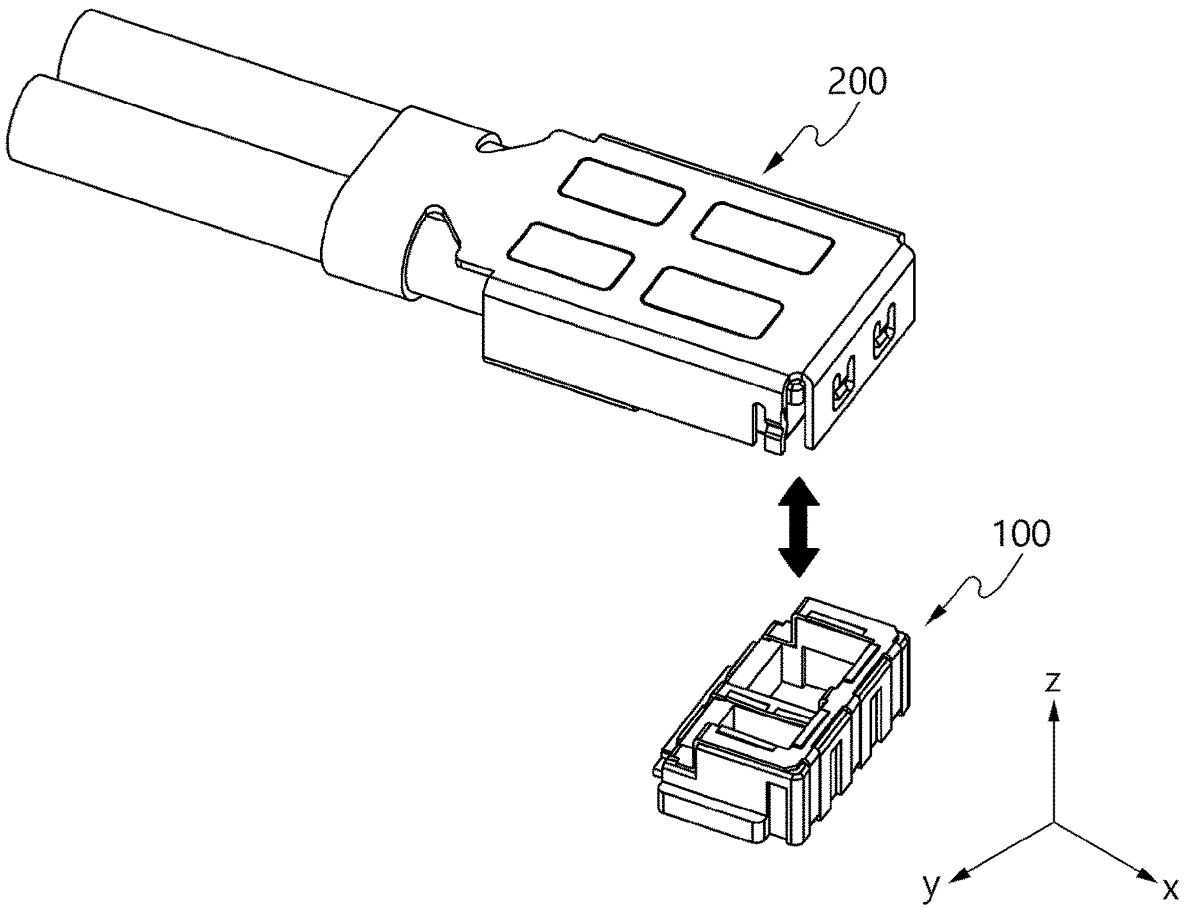
FIG. 2 is a perspective view showing a receptacle connector and a plug connector shown in FIG. 1.

FIG. 1 is a perspective view showing a connector assembly according to an embodiment, and FIG. 2 is a perspective view showing a receptacle connector and a plug connector shown in FIG. 1.

Hereinafter, in the drawings, the x-axis represents a direction between the front and rear of the connector assembly, the y-axis represents a direction between the left and right sides of the connector assembly, and the z-axis represents the direction between the top and bottom of the connector assembly. In addition, as used herein, the term “horizontal” and grammatical variants thereof refers to a direction parallel to an x-y plane.

Furthermore, as used herein, the term “rear surface” or “rearward” represents the direction toward a cable with respect to the front-and-rear direction, while the term “front surface” or “forward” refers to the opposite direction. Additionally, as used herein the term “lower surface” or “lower side” represents the direction from a plug connector to a receptacle connector with respect to the vertical direction, and the term “upper surface” or “upper side” refers to the opposite direction.

A connector assembly according to an embodiment includes a receptacle connector 100 and a plug connector 200. The plug connector 200 is connected to a cable 10 in a front-and-rear direction x. In the embodiments, a coaxial cable is described as an example of the cable 10, but the cable 10 may be of various types, such as a data cable, a wire, a flexible flat cable (FFC), a flexible printed circuit (FPC), or the like, rather than a coaxial cable. The receptacle connector 100 and the plug connector 200 may be coupled in the vertical direction.

Figure 3:
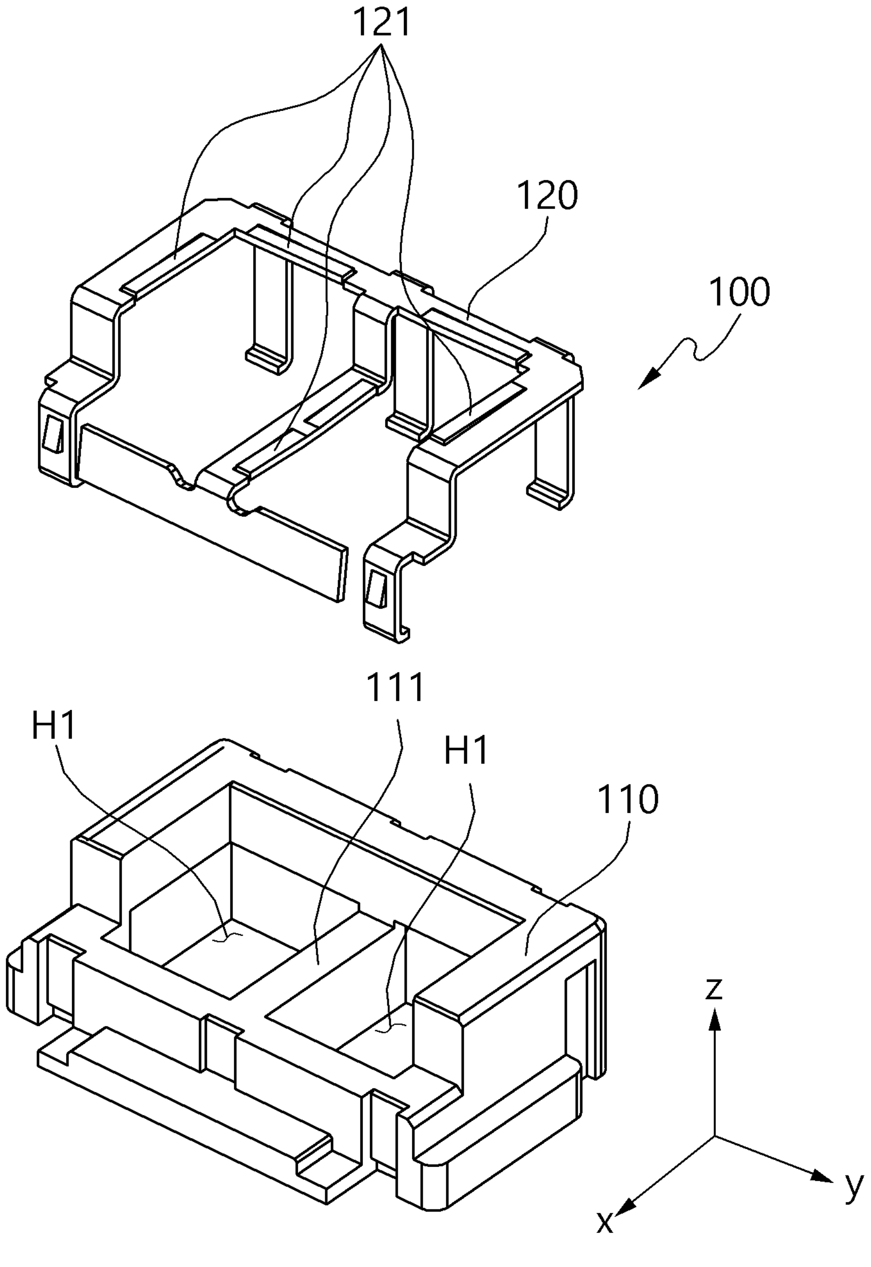
FIG. 3 is an exploded view showing the receptacle connector shown in FIG. 1.

FIG. 3 is an exploded view showing the receptacle connector 100 shown in FIG. 1.

Figure 4:
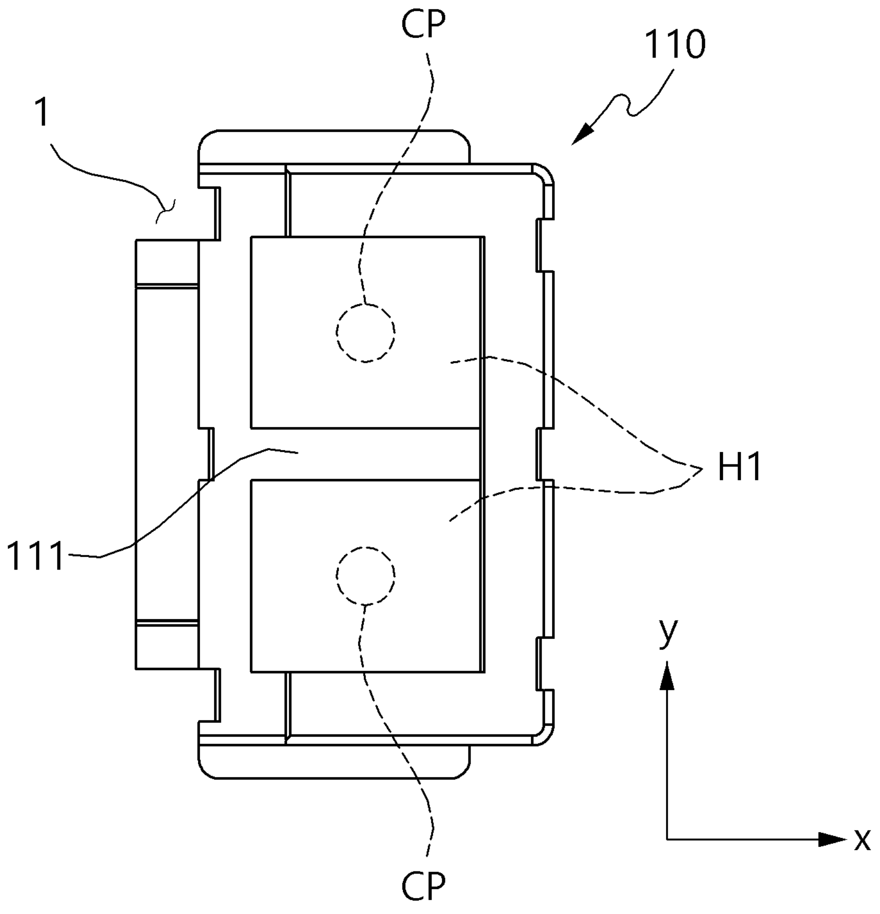
FIG. 4 is a plan view of a base of the receptacle connector shown in FIG. 3.

Referring to FIG. 3, the receptacle connector 100 does not include separate pins, and it serves to guide the plug connector 200 to enable direct connection with the contact points CP of a circuit board 1 (refer to FIG. 4).

The receptacle connector 100 may include a base 110 and an elastic portion 120. The base 110 may have a first hole H1 on its inner side. The first hole H may be formed by penetrating the base 110 in the vertical direction z. The first hole H1 may be divided into two spaces by a partition wall 111. The base 110 may be made of a metal material for electromagnetic wave shielding and grounding.

The elastic portion 120 may be made of metal or a shielding resin material and is partially formed in a plate shape with elasticity. The elastic portion 120 is attached to the base 110. For example, the elastic portion 120 may be mounted in the region on the surface of the base 110 that faces a shield can and a plug shell of the plug connector 200.

The elastic portion 120 minimizes the gap between the plug connector 200 and the base 110 when the plug connector 200 and the receptacle connector 100 are coupled to each other, thereby improving shielding performance. In addition, the elastic portion 120 may be provided with a plurality of cut elastic pieces 121. The elastic pieces 121 are arranged at portions facing the shield can and plug shell of the plug connector 200. The elastic pieces 121 may increase contact force between the plug connector 200, the elastic portion 120, and the base 110, thereby further improving shielding performance.

FIG. 4 is a plan view of the base 110 of the receptacle connector 100 shown in FIG. 3.

Referring to FIG. 4, the first hole H1 of the base 110 may be divided into two spaces arranged in the left-and-right direction by the partition wall 111. The receptacle connector 100 may be mounted on the circuit board 1 in such a way that the contact points CP of the circuit board 1 are positioned in each of these two spaces.

The base 110 may be mounted on the circuit board 1 by a surface mounting (surface mount device (SMD)/surface mount technology (SMT)) method, a single in-line package (SIP) method, a dual in-line package (DIP) method, or a quad in-line package (QIP) method, or may be mounted by selectively using the surface mounting method and a penetration method. Depending on an embodiment, the receptacle connector 100 may not be a separate component but may be integrally formed with the circuit board 1.

Figure 5:
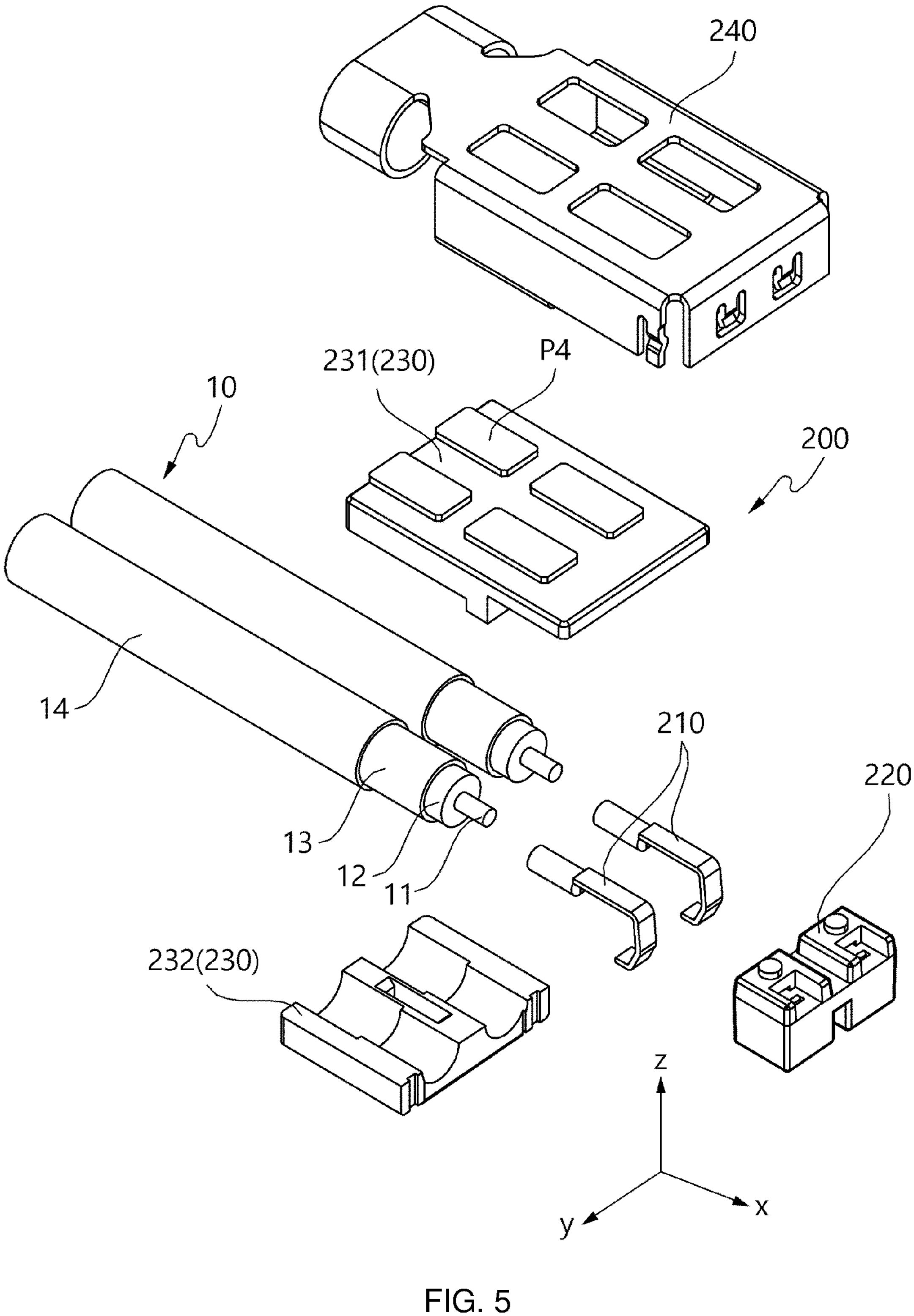
FIG. 5 is an exploded view of the plug connector shown in FIG. 1.

FIG. 5 is an exploded view of the plug connector 200 shown in FIG. 1.

Referring to FIG. 5, the cable 10 may include a signal line 11, a cable dielectric 12 arranged on the outside of the signal line 11, an external conductor 13 arranged on the outside of the cable dielectric 12, and an outer sheath 14 arranged on the outside of the external conductor 13. The cable dielectric 12 insulates and separates the signal line 11 from the outer conductor 13. The outer conductor 13 serves to shield electromagnetic waves from the signal line 11. The outer conductor 13 may be made of metal such as aluminum or copper. The outer sheath 14 serves to protect the outer conductor 13.

The plug connector 200, guided by the receptacle connector 100, is directly electrically connected to the circuit board 1. Additionally, the plug connector 200 has a configuration that doubly shields electromagnetic waves.

The plug connector 200 may include a pin 210, a dielectric 220, and a shield can 230.

One side of the pin 210 is electrically connected to the cable 10. Each pin 210 corresponds to one cable 10. Therefore, the number of pins 210 is equal to the number of cables 10. A plurality of cables 10 may be arranged in parallel along the left-and-right direction y, and correspondingly, a plurality of pins 210 may be arranged in parallel along the left-and-right direction y. In the embodiments, two cables 10 are described by way of example, but one cable 10 or three or more cables may be provided.

The signal line 11 of the cable 10 and the pin 210 may be connected by inserting the signal line 11 into one side of the pin 210, or one side of the pin 210 may be bent or soldered to be electrically connected to the signal line 11 of the cable 10.

The dielectric 220 ensures the rigidity of the pin 210 by fixing the opposite side of the pin 210 and serves to guide the movement of the pin 210. The size in the left-and-right direction y of the dielectric 220 may be adjusted according to the number of pins 210.

The shield can 230 is a member that blocks electromagnetic waves generated by the cable 10. The shield can 230 may be made of a metallic material. The shield can 230 has a shape that entirely surrounds the connecting portion between the cable 10 and the pin 210. The shield can 230 may cover the pin 210 in a manner that exposes the front portion of the pin 210 downward. The shield can 230 may be arranged at a distance from the pin 210.

The shield can 230 may include an upper shield can 231 and a lower shield can 232. The upper shield can 231 covers the upper side of the cable 10 and the pin 210. In addition, the lower shield can 232 covers the lower side of the connecting portion between the cable 10 and the pin 210. The upper shield can 231 may be formed to be longer in the forward direction than the lower shield can 232 so as to cover the front portion of the pin 210. The upper shield can 231 and the lower shield can 232 may be coupled to each other. The shield can 230 is illustrated as a combination of separate parts, namely, the upper shield can 231 and the lower shield can 232, but the present invention is not limited thereto such that the shield can 230 may be a single member.

Depending on an embodiment, the shield can 230 and the outer conductor 13 of the cable 10 may be coupled to each other by soldering.

When the plug connector 200 is coupled to the receptacle connector 100, the pin 210 makes direct contact with the contact point CP of the circuit board 1. To maintain the contact between the pin 210 and the contact point CP of the circuit board 1 when the pin 210 is pressed against the contact point CP, the pin 210 is required to have a structure that allows it to deform to secure elasticity.

Figure 6:
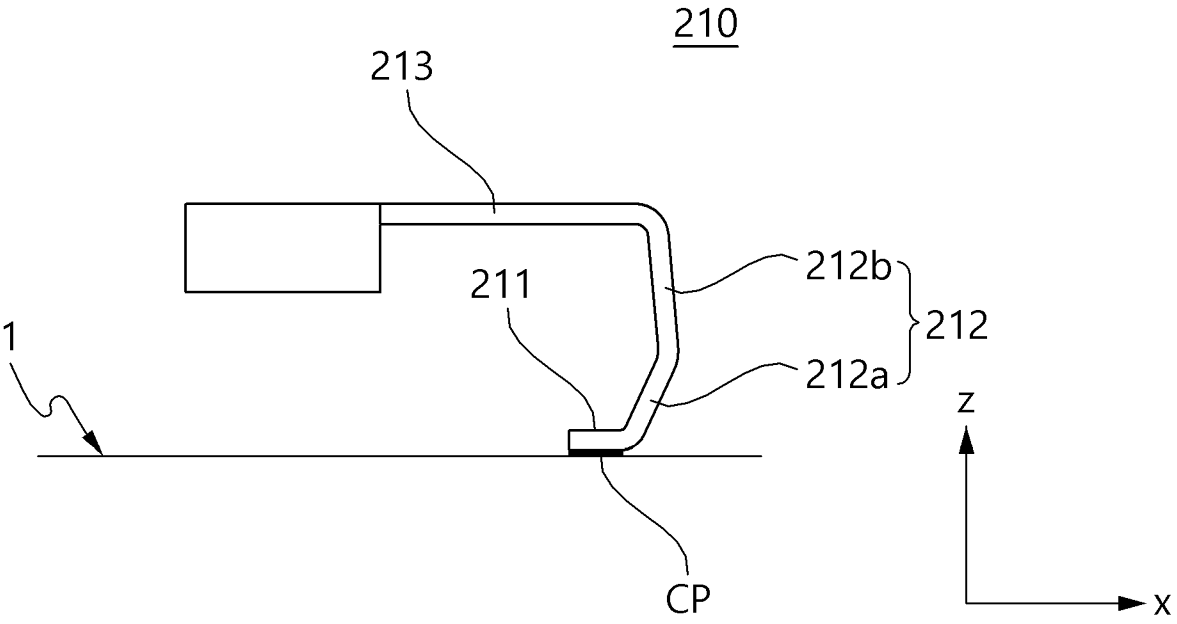
FIG. 6 is a side view of a pin shown in FIG. 5.

FIG. 6 is a side view of the pin 210 shown in FIG. 5.

Referring to FIG. 6, the pin 210 may include a contact portion 211, a first region 212, and a second region 213. The contact portion 211, the first region 212, and the second region 213 are distinguished from one another for the purpose of describing their functionality and shape but may be a single connected member.

The contact portion 211 is a region in contact with the contact point CP of the circuit board 1. The contact portion 211 may be horizontally arranged. The first region 212 may be bent in a first direction (e.g., a counterclockwise direction in FIG. 6) at the contact portion 211. The first region 212 is arranged overall in the vertical direction z. In addition, the second region 213 may be bent in the first direction at the first region 212. An end of the second region 213 is connected to the cable 10. The second region 213 may be arranged in parallel or diagonally to the contact portion 211.

This configuration of the pin 210 has the advantage of ensuring sufficient resiliency when the contact portion 211 comes into contact with the contact point CP of the circuit board 1.

The first region 212 may be divided into a 1-1$^{st}$ region 212*a* and a 1-2$^{nd}$ region 212*b*. The 1-1$^{st}$ region 212*a* is an area bent counterclockwise at the contact portion 211, and the 1-2$^{nd}$ region 212*b* corresponds to an area that is bent counterclockwise at the 1-1$^{st}$ region 212*a* and connected to the second region 213. Therefore, a portion of the first region 212 may have a shape protruding forward farther than the second region 213. This is to space the 1-1$^{st}$ region 212*a* apart rearward from the dielectric 220 in order to enhance the resiliency of the pin 210 and induce elastic deformation of the pin 210 near the contact portion 211.

Figure 7:
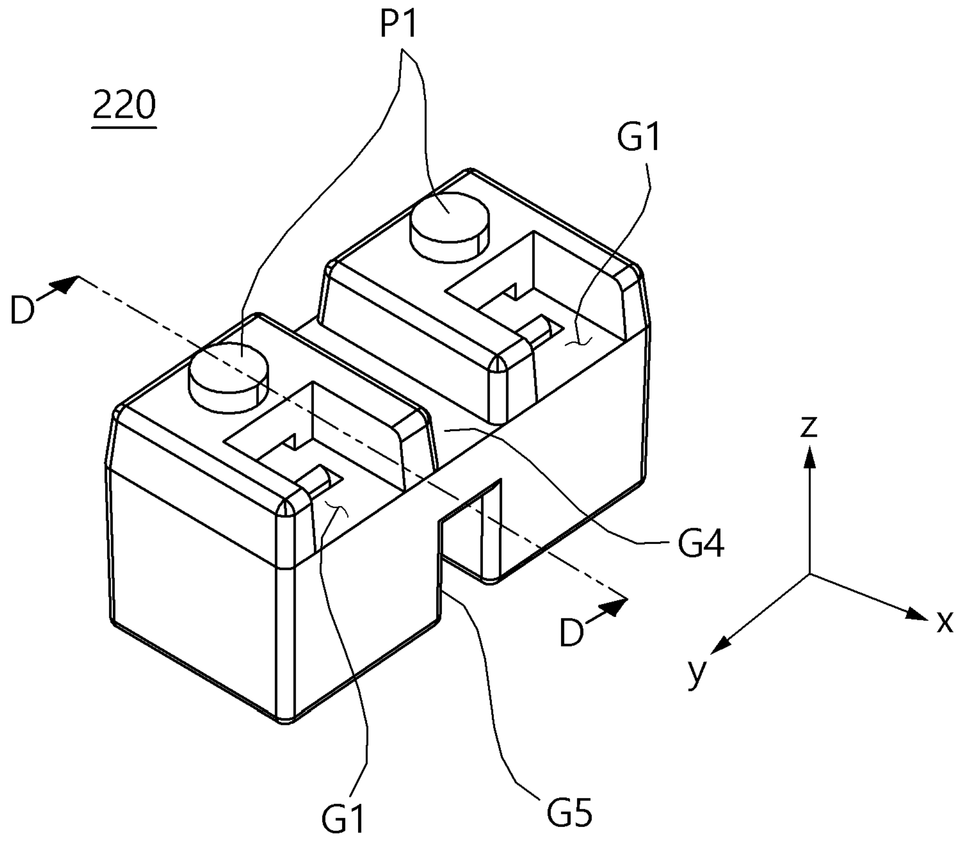
FIG. 7 is a perspective view of a dielectric shown in FIG. 5.
Figure 8:
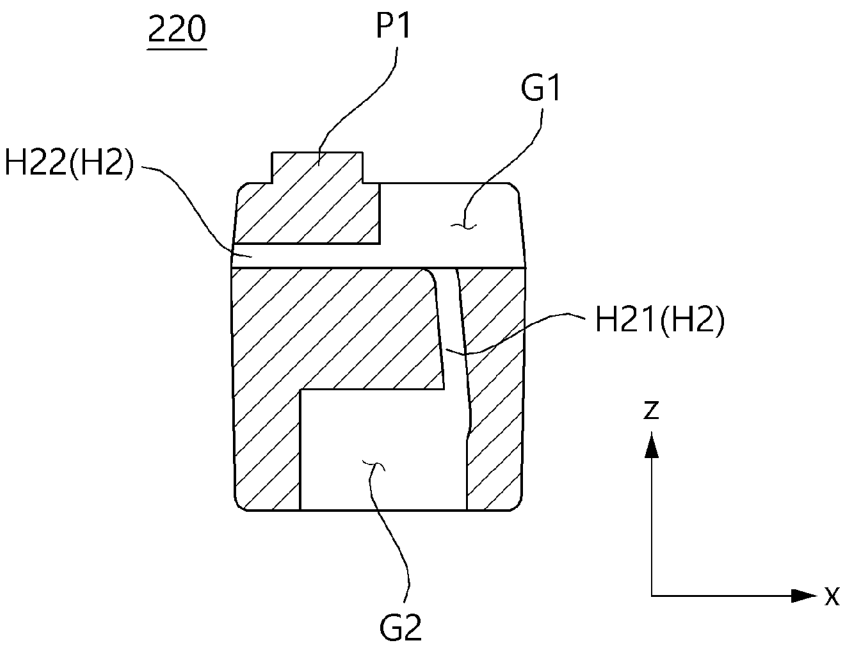
FIG. 8 is a side cross-sectional view of the dielectric taken along line D-D of FIG. 7.

FIG. 7 is a perspective view of the dielectric 220 shown in FIG. 5, and FIG. 8 is a side cross-sectional view of the dielectric 220 taken along line D-D of FIG. 7.

Referring to FIGS. 7 and 8, the dielectric 220 ensures the rigidity of the pin 210 by fixing the pin 210. Also, the dielectric 220 has a feature to fix the pin 210 so that it can undergo elastic deformation. Additionally, the dielectric 220 may guide the movement of the pin 210.

The dielectric 220 may include a second hole H2 in which the pin 210 is arranged and a first groove G1 and a second groove G2 communicating with the second hole H2.

The second hole H2 may be divided into a 2-1$^{st}$ hole H21 and a 2-2$^{nd}$ hole H22. The first groove G1 may be positioned between the 2-1$^{st}$ hole H21 and the 2-2$^{nd}$ hole H22, communicating with the 2-1$^{st}$ hole H21 and the 2-2$^{nd}$ hole H22. The first groove G1 may be arranged near the edges of the upper surface and the front surface of the dielectric 220. The second groove G2 communicates with the 2-2$^{nd}$ hole H22. Also, the second groove G2 may be concavely formed on the lower surface of the dielectric 220.

The 2-2$^{nd}$ hole H22 may be formed on the rear surface of the dielectric 220, facing toward the first groove G1. The 2-1$^{st}$ hole H21 may be formed in a direction from the first groove G1 to the second groove G2. The 2-2$^{nd}$ hole H22 may be arranged in the front-and-rear direction x, and the 2-1$^{st}$ hole H21 may be arranged in the vertical direction z.

The dielectric 220 may include a first protrusion P1 convexly protruding upward from the upper surface. The first protrusion P1 is provided for coupling with the upper shield can 231. The first protrusion P1 is inserted into a third groove G3 (refer to FIG. 11) of the upper shield can 231. A plurality of first protrusions P1 may be arranged. For example, two first protrusions P1 may be spaced apart from each other in the left-and-right direction y. However, the present invention is not limited to this, and conversely, protrusions may be arranged on the upper shield can 231, and grooves may be formed on the dielectric 220 for mutual coupling.

The dielectric 220 may include a fourth groove G4. The fourth groove G4 is also provided for coupling with the upper shield can 231. The fourth groove G4 may be concavely formed on the upper surface of the dielectric 220. Additionally, the fourth groove G4 may be arranged to penetrate through the rear and front surfaces of the dielectric 220. The fourth groove G4 may be positioned at the center of the dielectric 220 in the left-and-right direction y. The fourth groove G4 may be positioned between two first grooves G1 in the left-and-right direction y.

In addition, the dielectric 220 may include a fifth groove G5. The fifth groove G5 is provided for coupling with the base 110 of the receptacle connector 100. The fifth groove G5 may be concavely formed on the lower surface of the dielectric 220. Additionally, the fifth groove G5 may be arranged to penetrate through the rear and front surfaces of the dielectric 220. The fifth groove G5 may be positioned at the center of the dielectric 220 in the left-and-right direction y.

Figure 9:
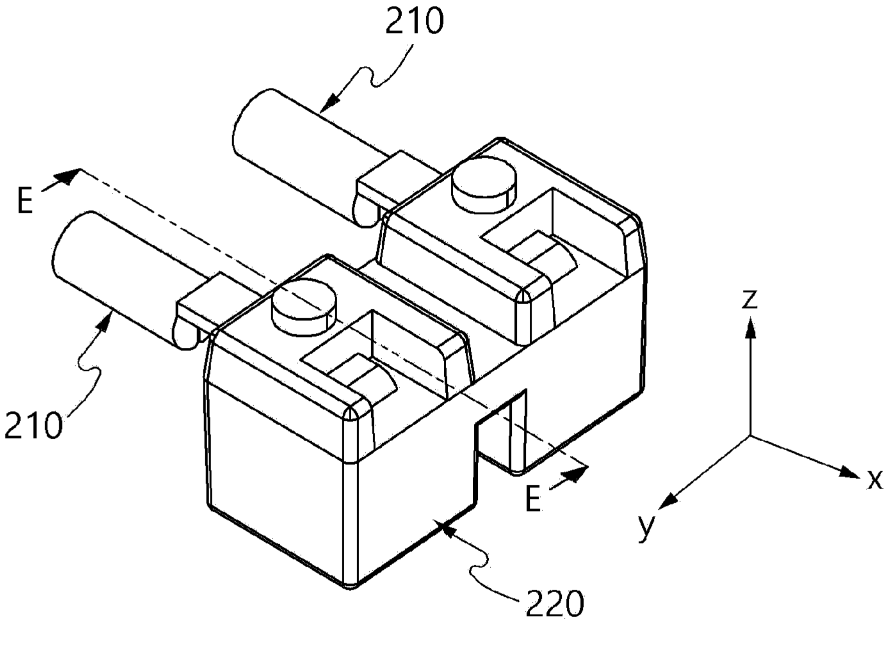
FIG. 9 is a perspective view of a dielectric with fixed pins.
Figure 10:
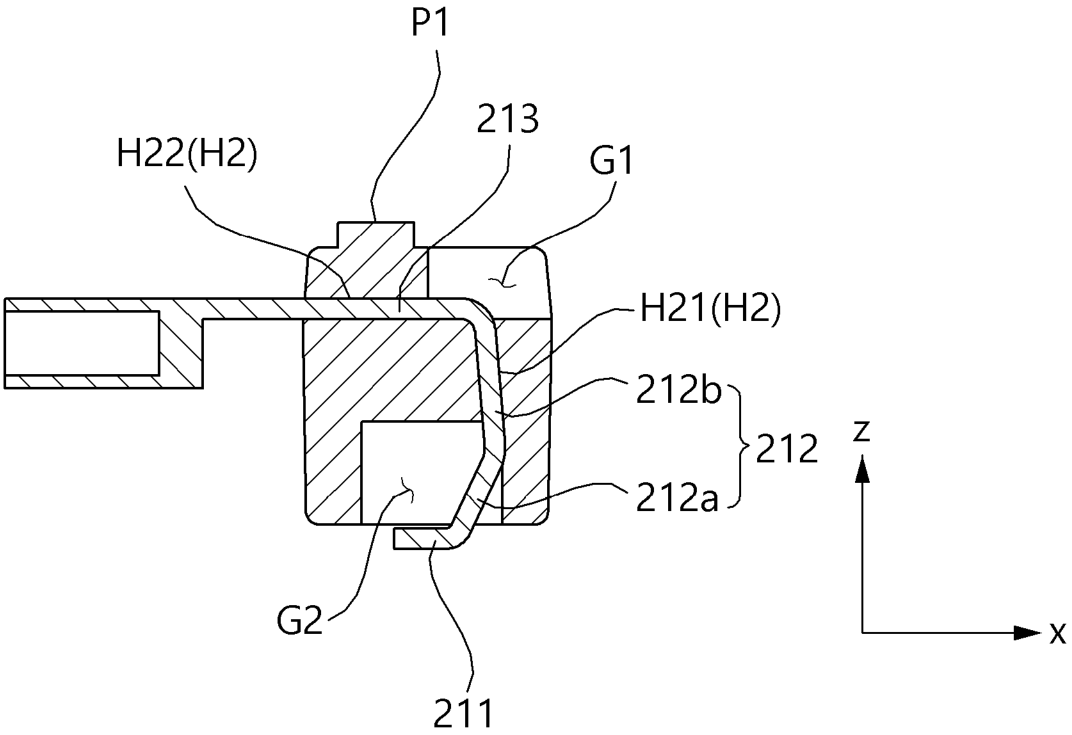
FIG. 10 is a side cross-sectional view of the dielectric taken along line E-E of FIG. 9.

FIG. 9 is a perspective view of the dielectric 220 with fixed pins 210, and FIG. 10 is a side cross-sectional view of the dielectric 220 taken along line E-E of FIG. 9.

Referring to FIGS. 9 and 10, the contact portion 211 of the pin 210 protrudes in the vertical direction z farther than the lower surface of the dielectric 220. The 1-1$^{st}$ region 212*a* of the pin 210 is positioned in the second groove G2, but is spaced apart from the dielectric 220, providing a space for deformation of the contact portion 211. The 1-2$^{nd}$ region 212*b* is inserted into the 2-1$^{st}$ hole of the dielectric 220. The second region 213 is inserted into the 2-2$^{nd}$ hole H22, but the connection portion between the second region 213 and the 1-2$^{nd}$ region 212*b* is exposed by the first groove G1.

The dielectric 220 fixes the second region 213 in the vertical direction z through the 2-2$^{nd}$ hole H22 of the pin 210 and fixes the 1-2$^{nd}$ region 212*b* in the front-and-rear direction x through the 2-1$^{st}$ hole H21, thereby fixing the pin 210 in both the vertical direction z and front-and-rear direction x to correspond to the shape of the pin 210, so that the rigidity of the pin 210 can be ensured.

Figure 11:
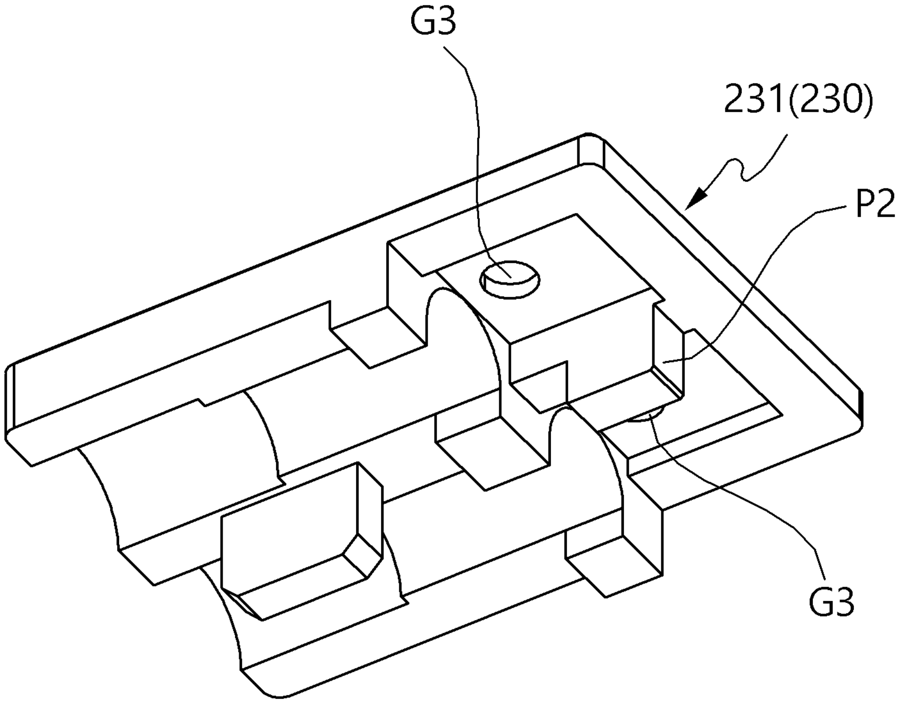
FIG. 11 is a bottom view of an upper shield can.

FIG. 11 is a bottom view of the upper shield can 231.

Referring to FIGS. 7 and 11, the upper shield can 231 may include a second protrusion P2 protruding from the surface facing the dielectric 220. The second protrusion P2 is inserted into the fourth groove G4 of the dielectric 220. The second protrusion P2 serves to fix the dielectric 220 and enhances the assembly of the dielectric 220 with the shield can 230. Specifically, the second protrusion P2 is positioned between the front sides of adjacent two pins 210 to prevent signal interference between the adjacent pins 210.

Meanwhile, the upper shield can 231 may include a third groove G3. The first protrusion P1 of the dielectric 220 is inserted into the third groove G3. However, the present invention is not limited to this, and conversely, protrusions may be arranged on the upper shield can 231, and grooves may be formed on the dielectric 220 for mutual coupling.

Figure 12:
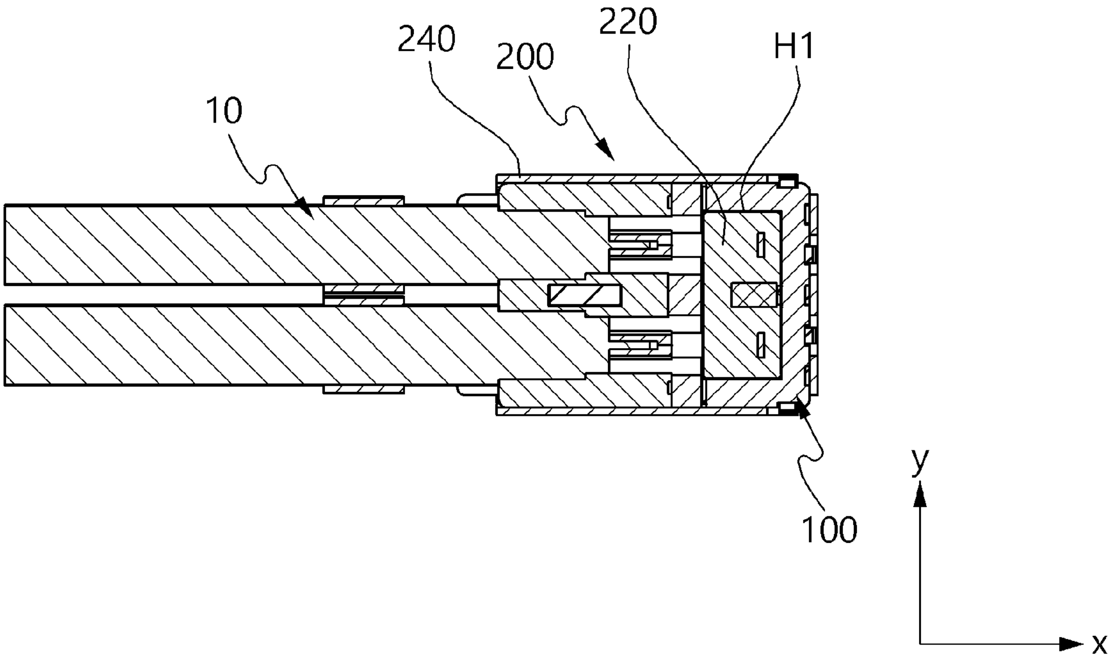
FIG. 12 is a cross-sectional view of the connector assembly taken along line A-A of FIG. 1.

FIG. 12 is a cross-sectional view of the connector assembly taken along line A-A of FIG. 1.

Referring to FIG. 12, when the plug connector 200 is coupled to the receptacle connector 100, the receptacle connector 100 serves to guide the dielectric 220 to ensure that the pin 210 makes contact with the circuit board 1. The front surface and both lateral surfaces of the dielectric 220 are positioned facing the inner walls of the first hole H1, respectively. Therefore, when the plug connector 200 is coupled to the receptacle connector 100, the front and lateral surfaces of the dielectric 220 may serve as guiding surfaces for the coupling of the receptacle connector 100 and the plug connector 200 since the dielectric 220 is inserted along the inner walls of the first hole H1.

Figure 13:
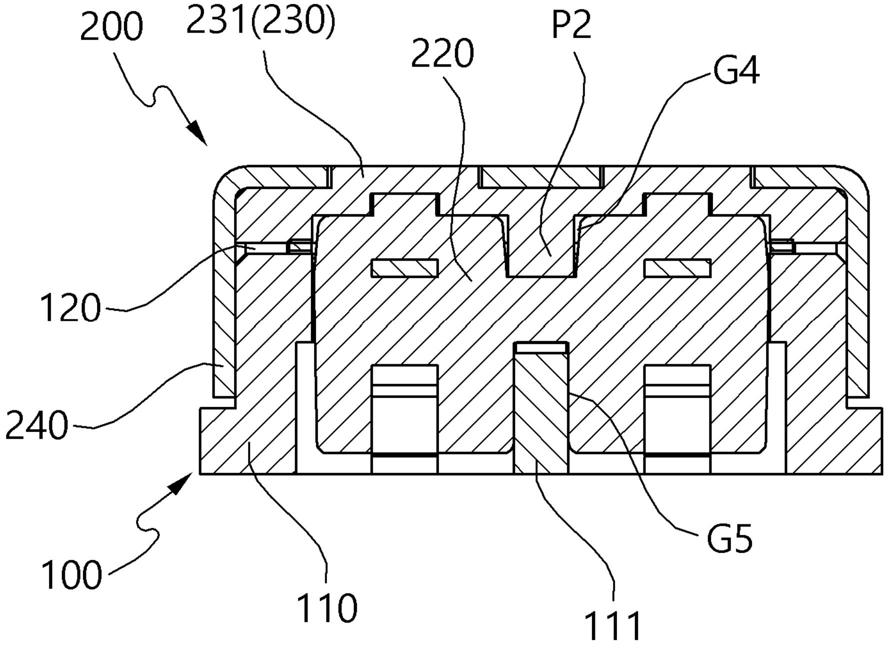
FIG. 13 is a cross-sectional view of the connector assembly taken along line B-B of FIG. 1.

FIG. 13 is a cross-sectional view of the connector assembly taken along line B-B of FIG. 1.

Referring to FIG. 13, in the coupled state of the plug connector 200 to the receptacle connector 100, the partition wall 111 positioned on the base 110 of the receptacle connector 100 is inserted into the fifth groove G5 of the dielectric 220, ensuring the assembly between the dielectric 220 and the base 110 of the receptacle connector 100. Additionally, as the partition wall 111 moves along the fifth groove G5, the positions of the pin 210 and the contact point CP on the circuit board 1 are aligned.

Figure 14:
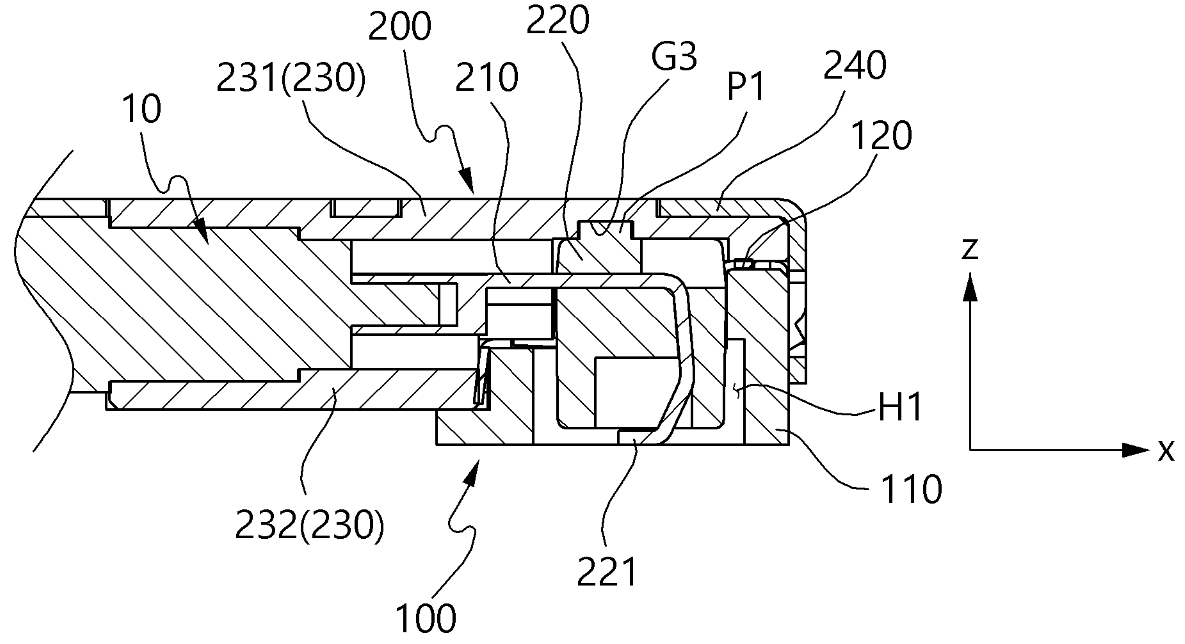
FIG. 14 is a cross-sectional view of the connector assembly taken along line C-C of FIG. 1.
Figure 15:
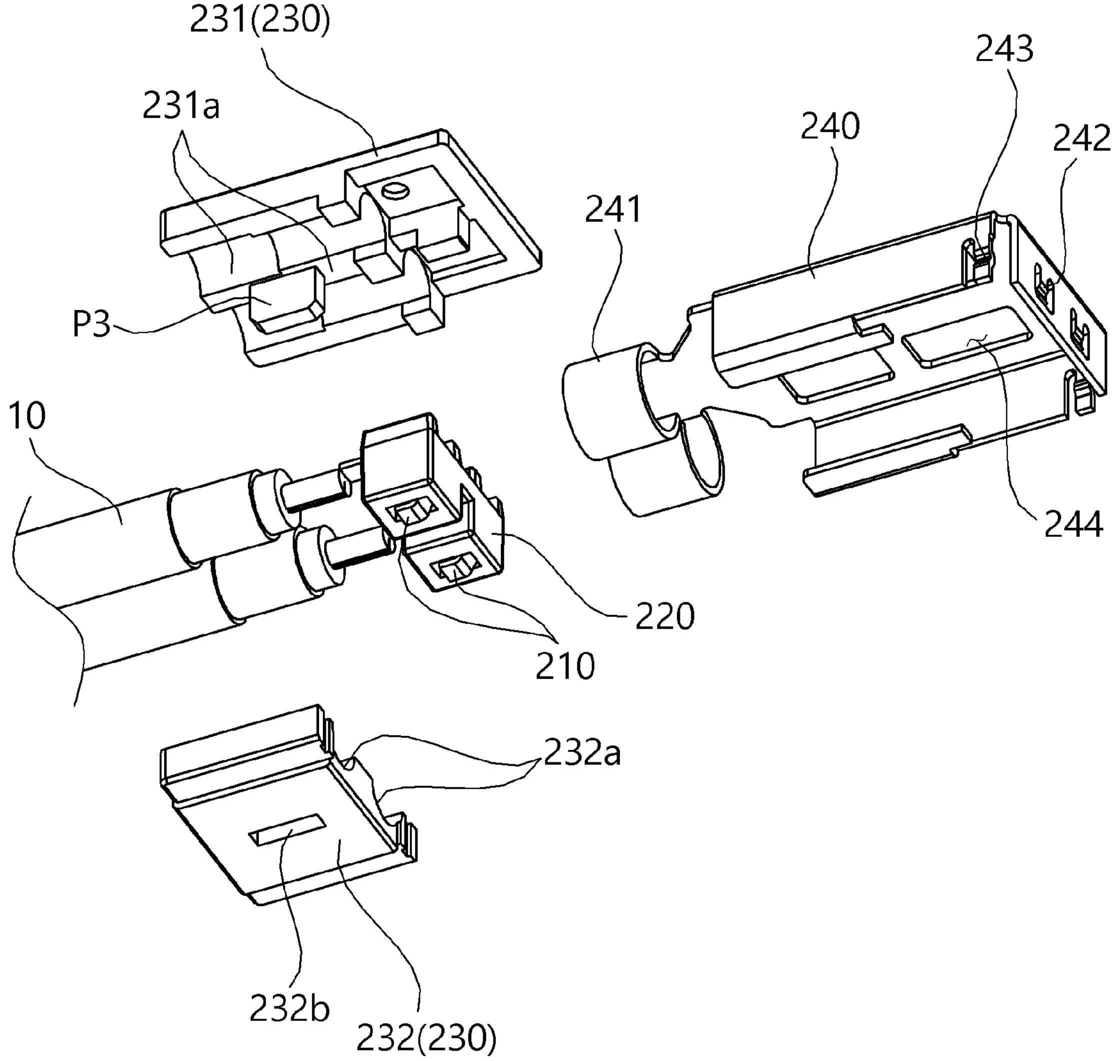
FIG. 15 is an exploded view of a plug connector viewed from the bottom.

FIG. 14 is a cross-sectional view of the connector assembly taken along line C-C of FIG. 1, and FIG. 15 is an exploded view of the plug connector viewed from the bottom.

Referring to FIGS. 14 and 15, the upper shield can 231 may include an upper seating groove 231*a*. The upper seating groove 231*a* may be positioned on the inner surface of the upper shield can 231 facing the cable 10, allowing the upper side of the cable 10 to be seated. In addition, the lower shield can 232 may include a lower seating groove 232*a*. The lower seating groove 232*a* may be positioned on the inner surface of the lower shield can 232 facing the cable 10, allowing the lower side of the cable 10 to be seated.

The upper shield can 231 may include a third protrusion P3 protruding from the surface facing the cable 10. The third protrusion P3 is inserted into a through hole 232*b* of the lower shield can 232. The third protrusion P3 is positioned between two adjacent cables 10 to shield between the adjacent cables 10, and positioned between the rear portions of adjacent pins 210 to shield between the adjacent pins 210. In addition, the third protrusion P3, when inserted into and fixed to the through hole 232*b*, serves to couple the upper shield can 231 and the lower shield can 232.

Figure 16:
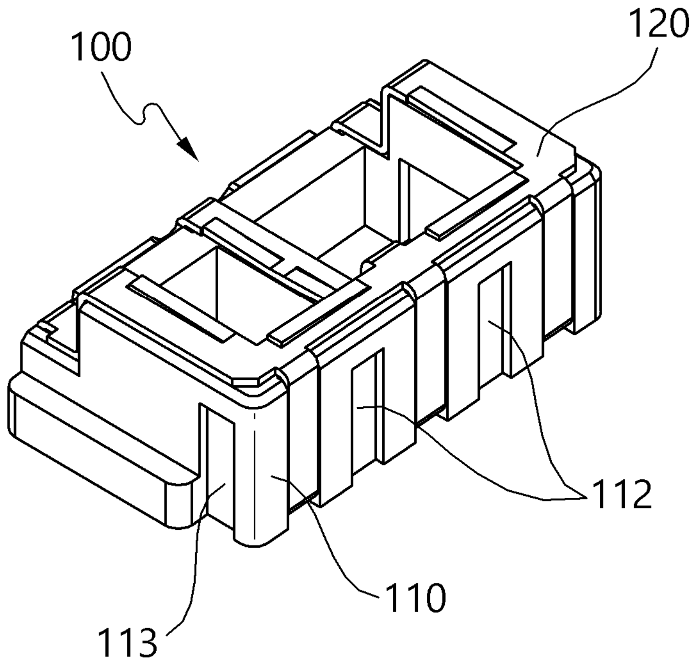
FIG. 16 is a perspective view showing a receptacle connector.

FIG. 16 is a perspective view showing the receptacle connector 100.

Referring to FIGS. 15 and 16, the plug connector 200 may include a plug shell 240. The plug shell 240 is arranged on the outside of the shield can 230.

The plug shell 240 may be formed to have an open lower portion and enclose the upper and lateral surfaces of the shield can 230 to expose the front portion of the pin 210 downwards. The plug shell 240 may be made of a metal material to shield electromagnetic waves. Also, the plug shell 240 may include a wrapping portion 241 that surrounds and supports a portion of the cable 10 exposed from the rear of the shield can 230 to the outside of the shield can 230. The wrapping portion 241 may extend rearward from the upper portion of the plug shell 240. The wrapping portion 241 may prevent damage to the cable 10 due to excessive bending or dislodging.

The plug shell 240 may include elastic coupling portions 242 and 243 on the front and lateral surfaces thereof. In addition, the base 110 of the receptacle may include a plurality of coupling grooves 112 and 113 on the front and lateral surfaces thereof to which the elastic coupling portions are fastened. When the plug connector 200 coupled to the receptacle connector 100, the elastic coupling portions 242 and 243 may be secured in the coupling grooves 112 and 113, ensuring a sturdy coupling between the plug connector 200 and the receptacle connector 100.

Referring to FIGS. 5 and 15, a plurality of fourth protrusions P4 may be arranged on the upper surface of the upper shield can 231. In addition, through holes 244 that correspond to the fourth protrusions P4 may be formed on the upper portion of the plug shell 240. The plug shell 240 and the upper shield can 231 can be tightly coupled to each other as the fourth protrusions P4 are inserted into the through holes 244.

The electromagnetic waves generated through the signal line 11 and the external conductor 13 of the cable 10, and the pin 210 are primarily shielded by the shield can 230 and secondarily shielded by the plug shell 240, enhancing electromagnetic shielding performance. Further, electromagnetic waves between the adjacent signal lines 11 or between the adjacent pins 210 are shielded by the second protrusion P2 and the third protrusion P3 of the shield can 230, so that interference between signals can be minimized.

Depending on an embodiment, an additional shell that covers the plug shell 240 may be provided to improve shielding performance or increase reliability with respect to vibration. In addition, although in the present embodiment it is illustrated that there are gaps between the front surface and the lateral surfaces of the plug shell 240, the lateral surfaces may be extended and bent toward the front surface such that a portion of the front surface may be surrounded by the extended bent portions according to an embodiment.

A number of exemplary embodiments have been particularly shown and described with reference to certain exemplary embodiments thereof. It will be understood by one of ordinary skill in the art that various changes in form and details may be made therein without departing from the spirit and scope of the exemplary embodiments as defined by the following claims. The exemplary embodiments should be considered in a descriptive sense only and not for purposes of limitation. Therefore, the scope of the exemplary embodiments is defined not by the detailed description of the exemplary embodiments but by the following claims, and all differences within the scope will be construed as being included in the exemplary embodiments.

What is claimed is:

1. A connector assembly comprising:

a receptacle arranged on a substrate; and a plug coupled to the receptacle, wherein the plug includes: a pin having one side electrically connected to a cable and having a contact portion arranged on the other side;

a dielectric arranged on the outside of the pin;

a shield can arranged on the outside of the dielectric; and a plug shell arranged on the outside of the shield can, wherein the receptacle comprises a first hole, wherein the dielectric comprises a second hole in which the pin is arranged, wherein the pin is arranged in the second hole such that the contact portion protrudes farther than the outer surface of the dielectric, wherein the dielectric is positioned in the first hole so that the contact portion is directly and elastically in contact with a contact point of the substrate, wherein the pin comprises a first region that is bent counterclockwise at the contact portion and a second region that is bent counterclockwise at the first region and connected to the cable, wherein the contact portion and the second region are arranged in parallel or diagonally, and wherein the first region comprises a 1-1$^{st}$ region that is bent counterclockwise at the contact portion, and a 1-2$^{nd}$ region that is bent counterclockwise at the 1-1$^{st}$ region and connected to the second region.

2. The connector assembly of claim 1, wherein:

the dielectric comprises a first groove, the second hole may include a 2-1$^{st}$ hole and a 2-2$^{nd}$ hole and the first groove communicates with the 2-1$^{st}$ hole and the 2-2$^{nd}$ hole, and directions of the 2-1$^{st}$ hole and the 2-2$^{nd}$ hole are different from each other.

3. The connector assembly of claim 2, wherein:

the 1-2$^{nd}$ region is arranged in the 2-1$^{st}$ hole, the second region is arranged in the 2-2$^{nd}$ hole, and the 1-1$^{st}$ region and the contact portion are spaced apart from the dielectric.

4. The connector assembly of claim 2, wherein:

the dielectric comprises a second groove communicating with the 2-2$^{nd}$ hole, a portion of the first region is arranged inside the second groove, and the contact portion is arranged outside the second groove.

5. The connector assembly of claim 1, wherein:

the dielectric comprises an upper surface in contact with the shield can and a first protrusion protruding from the upper surface, and the shield can comprises a third groove in which the protrusion is positioned.

6. The connector assembly of claim 5, wherein:

the dielectric comprises a fourth groove concavely formed on the upper surface, the shield can comprises a second protrusion positioned in the fourth groove, and the second protrusion is positioned between two of the pins.

7. The connector assembly of claim 1, wherein the dielectric is guided along an inner wall of the first hole.

8. The connector assembly of claim 1, wherein:

the dielectric comprises a fifth groove and a partition wall dividing the first hole of the receptacle, and the partition wall is arranged in the fifth groove.

* * * * *